US012500987B2

(12) United States Patent
Sato et al.

(10) Patent No.: US 12,500,987 B2
(45) Date of Patent: Dec. 16, 2025

(54) IMAGE READING DEVICE, IMAGE FORMING APPARATUS, NON-TRANSITORY COMPUTER READABLE MEDIUM STORING IMAGE READING PROGRAM, AND IMAGE READING METHOD REDUCING IMAGE READING TIME BY SEQUENTIALLY SWITCHING LIGHT SOURCES TURNING ON SECOND LIGHT SOURCE FOR SHORTER TIME THAN FIRST LIGHT SOURCE

(71) Applicant: FUJIFILM Business Innovation Corp., Tokyo (JP)

(72) Inventors: Takaharu Sato, Kanagawa (JP); Kenji Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 369 days.

(21) Appl. No.: 17/948,215

(22) Filed: Sep. 19, 2022

(65) Prior Publication Data

US 2023/0308576 A1    Sep. 28, 2023

(30) Foreign Application Priority Data

Mar. 23, 2022  (JP) ................................ 2022-047440

(51) Int. Cl.
*H04N 1/028* (2006.01)
*H04N 1/00* (2006.01)
(Continued)

(52) U.S. Cl.
CPC ..... *H04N 1/02895* (2013.01); *H04N 1/00933* (2013.01); *H04N 1/02845* (2013.01);
(Continued)

(58) Field of Classification Search
None
See application file for complete search history.

(56) References Cited

U.S. PATENT DOCUMENTS 6,498,867 B1 * 12/2002 Potucek ............. H04N 1/02815
382/274
7,064,874 B2 * 6/2006 Imai ..................... H04N 1/2032
358/448
(Continued)

FOREIGN PATENT DOCUMENTS

CN       107079074      8/2017
EP       3391637        7/2020
(Continued)

OTHER PUBLICATIONS

"Office Action of Europe Counterpart Application", issued on Feb. 29, 2024, p. 1-p. 6.
(Continued)

*Primary Examiner* — Scott A Rogers
(74) *Attorney, Agent, or Firm* — JCIPRNET

(57) ABSTRACT

An image reading device includes plural light sources that irradiate an image reading target with light at different angles; and a switching mechanism that sequentially switches the light incident to the image reading target from the plural light sources during an image reading operation on the image reading target.

16 Claims, 8 Drawing Sheets

(51) Int. Cl.
*H04N 1/10* (2006.01)
*H04N 1/40* (2006.01)

(52) U.S. Cl.
CPC ....... *H04N 1/40056* (2013.01); *H04N 1/1013* (2013.01); *H04N 2201/0081* (2013.01)

(56) References Cited

U.S. PATENT DOCUMENTS

| | | | |
|---|---|---|---|
| 7,388,184 B2* | 6/2008 | Izumi | H04N 1/0318 |
| | | | 257/E27.146 |
| 7,643,183 B2 | 1/2010 | Nakaya et al. | |
| 9,160,868 B2* | 10/2015 | Umemoto | H04N 1/401 |
| 10,890,441 B2* | 1/2021 | Sonoda | G01N 21/892 |
| 11,172,089 B2* | 11/2021 | Shimizu | H04N 1/00755 |
| 11,933,603 B2* | 3/2024 | Hiramatsu | G01B 11/26 |
| 11,936,829 B2* | 3/2024 | Sugai | H04N 1/0288 |
| 2006/0215238 A1* | 9/2006 | Nakaya | H04N 1/1013 |
| | | | 358/474 |
| 2009/0002774 A1 | 1/2009 | King et al. | |
| 2021/0302154 A1 | 9/2021 | Hiramatsu et al. | |

FOREIGN PATENT DOCUMENTS

| | | | | |
|---|---|---|---|---|
| GB | 2325580 A | * | 11/1998 | ......... H04N 1/02815 |
| JP | 2006279228 | | 10/2006 | |

OTHER PUBLICATIONS

"Search Report of Europe Counterpart Application", issued on Jun. 29, 2023, pp. 1-10.

"Office Action of Europe Counterpart Application", issued on Jul. 7, 2025, pp. 1-7.

* cited by examiner

IMAGE READING DEVICE, IMAGE FORMING APPARATUS, NON-TRANSITORY COMPUTER READABLE MEDIUM STORING IMAGE READING PROGRAM, AND IMAGE READING METHOD REDUCING IMAGE READING TIME BY SEQUENTIALLY SWITCHING LIGHT SOURCES TURNING ON SECOND LIGHT SOURCE FOR SHORTER TIME THAN FIRST LIGHT SOURCE

CROSS-REFERENCE TO RELATED APPLICATIONS

This application is based on and claims priority under 35 USC 119 from Japanese Patent Application No. 2022-047440 filed Mar. 23, 2022.

BACKGROUND

(i) Technical Field

The present disclosure relates to an image reading device reading an image, an image forming apparatus including the image reading device, a non-transitory computer readable medium storing an image reading program, and an image reading method.

(ii) Related Art

JP2006-279228A discloses an image pick-up apparatus including an irradiation unit that irradiates an image pick-up target with light, a first imaging unit that images diffused reflected light from the image pick-up target irradiated with the light by the irradiation unit, a second imaging unit that images specularly reflected light from the image pick-up target irradiated with the light by the irradiation unit, an image pick-up unit that receives the light imaged by the first or second imaging unit and generates an image signal corresponding to the light, an image data generation unit that combines a first image signal generated by the image pick-up unit according to the light imaged by the first imaging unit with a second image signal generated by the image pick-up unit according to the light imaged by the second imaging unit to generate image data, and an image data output unit that outputs the image data generated by the image data generation unit.

SUMMARY

Incidentally, there is a technique in which an image reading operation is performed on an image reading target for each light source and obtained image signals are combined. However, an image reading operation is necessary for each light source and thus the image reading time is required to be reduced.

Aspects of non-limiting embodiments of the present disclosure relate to an image reading device capable of reducing an image reading time compared with a configuration in which an image reading operation is performed for each of a plurality of light sources that irradiate an image reading target with light at different angles.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image reading device including a plurality of light sources that irradiate an image reading target with light at different angles; and a switching mechanism that sequentially switches the light incident to the image reading target from the plurality of light sources during an image reading operation on the image reading target.

BRIEF DESCRIPTION OF THE DRAWINGS

Exemplary embodiment(s) of the present invention will be described in detail based on the following figures, wherein:

FIG. 5 is a diagram showing the time required for scanning in Example 1 in which one scanning operation is performed while a plurality of light sources are sequentially turned on;

FIG. 6 is a diagram showing the time required for scanning in Example 2 in which one scanning operation is executed while a plurality of light sources are sequentially turned on;

FIG. 7 is a diagram showing the time required for scanning in Example 3 in which one scanning operation is executed while a plurality of light sources are sequentially turned on;

DETAILED DESCRIPTION

Hereinafter, an exemplary embodiment of the present disclosure will be described with reference to the drawings.

Figure 2:
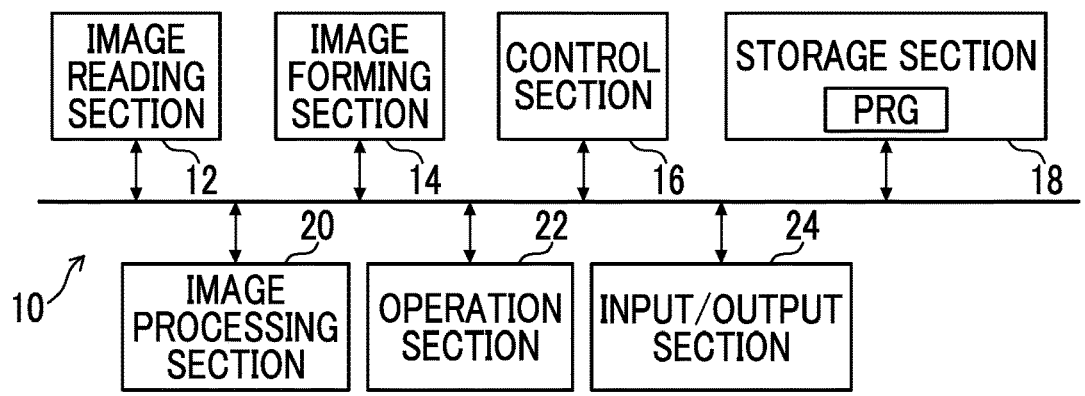
FIG. 2 is a functional block diagram of the image forming apparatus according to the exemplary embodiment of the present disclosure.

FIG. 2 is a block diagram showing a functional configuration of an image forming apparatus 10 according to the present exemplary embodiment. The image forming apparatus 10 includes an image reading section 12 and an image forming section 14. The image reading section 12 of the present exemplary embodiment is an example of an image reading device in the present disclosure.

The image reading section 12 has a function of reading an image from an image reading target. Specifically, the image reading section 12 optically reads surface characteristics of the image reading target and generates image information representing the reading result. Examples of the image reading target include flat objects such as paper and woven fabrics. The image reading target may be a three-dimensional object. In the present exemplary embodiment, an original document M having an image on a surface thereof is used as an example of an image reading target.

The image forming section 14 has a function of forming an image on a recording medium P such as paper on the basis of the image information read by the image reading section 12.

The image forming apparatus 10 further includes a control section 16, a storage section 18, an image processing section 20, an operation section 22, and an input/output section 24.

The control section 16 has a function of controlling an operation of each unit of the image forming apparatus 10. The control section 16 of the present exemplary embodiment is configured with a computer in which a central processing unit (CPU), a read only memory (ROM), a random access memory (RAM), and the like are connected to each other to be communicable with each other via a bus. The control section 16 controls the operation of each unit of the image forming apparatus 10 by executing various programs PRG stored in the storage section 18.

The storage section 18 has a function of storing the above program PRG or the like. The storage section 18 of the present exemplary embodiment is, for example, a storage device such as a hard disk drive (HDD), a solid state drive (SSD), or a flash memory, and stores the above programs PRG or the like.

The above programs PRG may be stored in the above ROM.

The image processing section 20 has a function of performing set image processing on an image signal generated by the image reading section 12 to generate image information and outputting the image information to the image forming section 14. The image processing section 20 includes, for example, image processing circuits such as a plurality of application specific integrated circuits (ASICs) or large scale Integration (LSI), and an image memory that temporarily stores image data, and various types of image processing is executed by the respective image processing circuits.

The image processing section 20 may output image data to the input/output section 24 or the operation section 22 as necessary.

The operation section 22 has a function of sending an input instruction by an operator to the control section 16. As an example, the operation section 22 of the present exemplary embodiment includes a touch panel type display, various buttons, and the like, and displays an image on the basis of the image data output by the image processing section 20, or sends an input instruction by the operator to the control section 16.

The input/output section 24 has a function of exchanging data with an external device. That is, the input/output section 24 of the present exemplary embodiment functions as an interface device.

Image Reading Section 12

Figure 1:
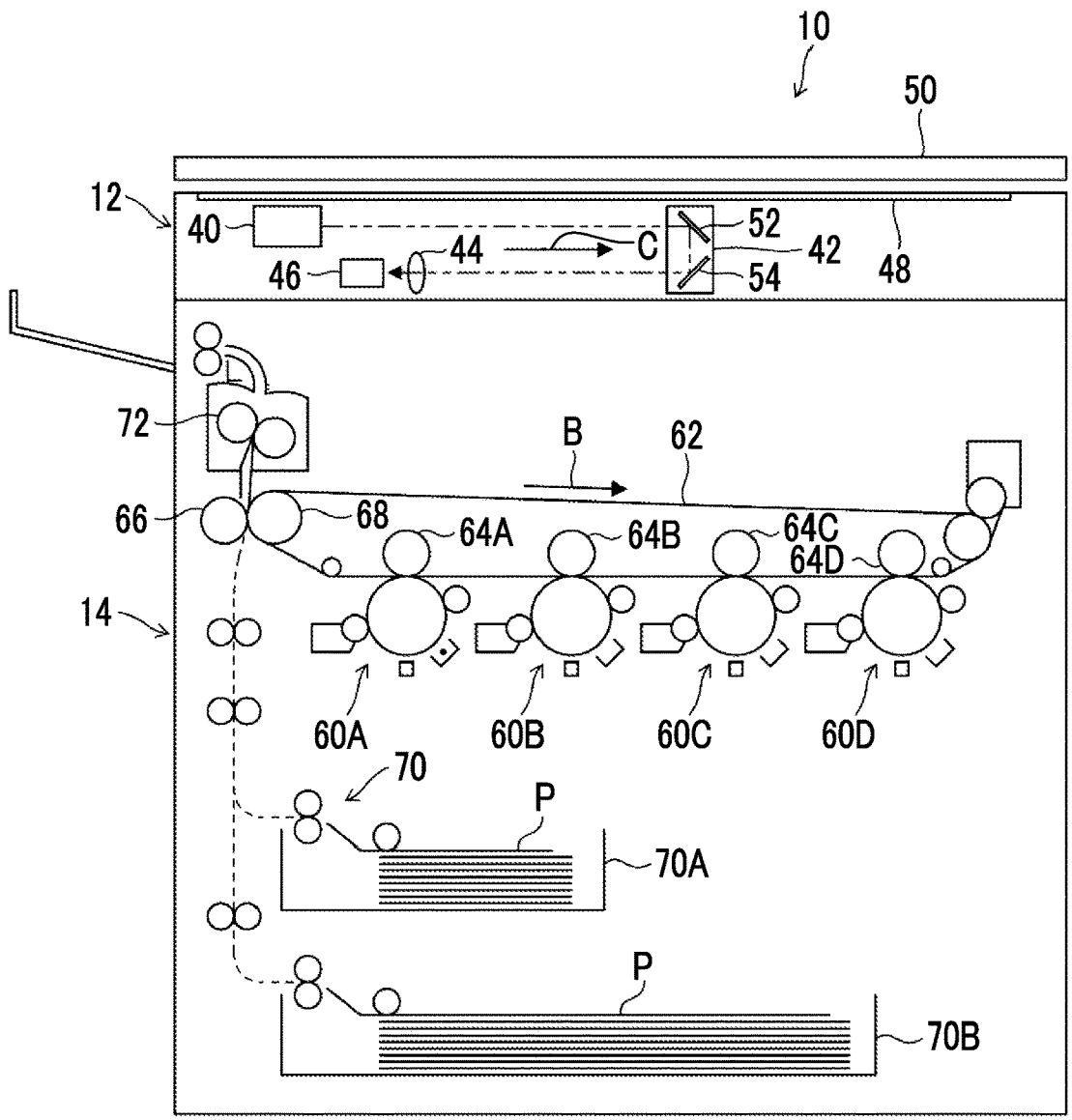
FIG. 1 is a diagram showing an apparatus configuration of an image forming apparatus according to an exemplary embodiment of the present disclosure.
Figure 3:
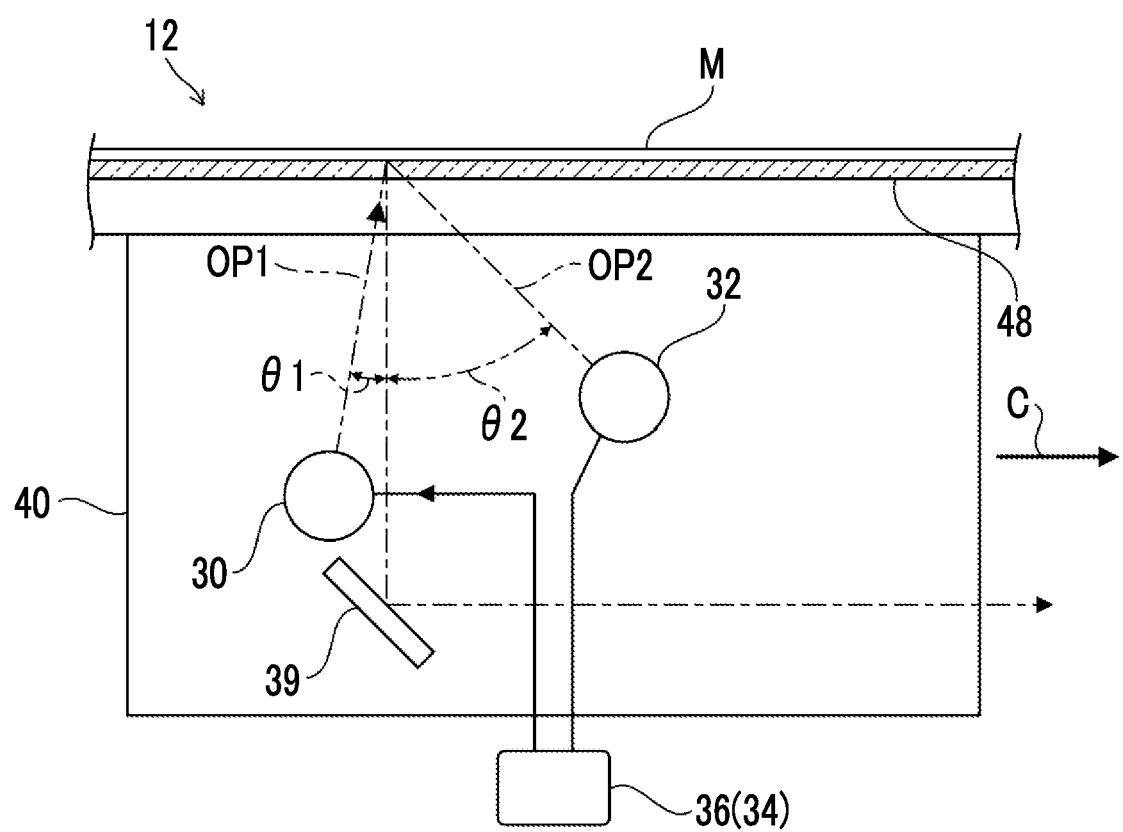
FIG. 3 is a diagram showing a device configuration of an image reading device according to the exemplary embodiment of the present disclosure, and shows a scanning operation in which light from a first light source is incident to an image reading target.

Next, the image reading section 12 will be described. FIGS. 1 and 3 show a device configuration of the image reading section 12.

The image reading section 12 includes a full-rate carriage 40, a half-rate carriage 42, an imaging optical system 44, a sensor 46, a platen glass 48, and a platen cover 50. The full-rate carriage 40 of the present exemplary embodiment is an example of a casing in the present disclosure.

As shown in FIGS. 1 and 3, the full-rate carriage 40 includes a light source 30, a light source 32, and a switching mechanism 34, which will be described later. The full-rate carriage 40 has a function of moving in a sub-scanning direction at a predetermined speed. Specifically, the full-rate carriage 40 moves in the sub-scanning direction at a predetermined speed in a case where the light source 30 and the light source 32 alternately irradiate the original document M with light to read an image. In FIGS. 1 and 3, the sub-scanning direction is denoted by an arrow C. In the following description, an operation of reading the original document M while the full-rate carriage 40 moves in the sub-scanning direction will be referred to as a "scanning operation".

As shown in FIG. 1, the half-rate carriage 42 includes a mirror 52 and a mirror 54, and has a function of guiding the light from the full-rate carriage 40 to the imaging optical system 44. The half-rate carriage 42 has a function of moving in the sub-scanning direction at a predetermined speed. Specifically, the half-rate carriage 42 moves in a direction identical to the direction of the full-rate carriage 40 at half the speed of the full-rate carriage 40 in a case where the original document M is irradiated with light from the light source 30 of the full-rate carriage 40 to read an image.

The imaging optical system 44 has a function of imaging reflected light from the original document M at a position of the sensor 46. As shown in FIG. 1, the imaging optical system 44 is provided on an optical path connecting the mirror 54 to the sensor 46. The imaging optical system 44 is configured with a mirror, an imaging lens (for example, an fθ lens), and the like.

As shown in FIG. 1, the sensor 46 has a function of receiving the reflected light imaged by the imaging optical system 44 and generating an image signal according to the received light. Specifically, the sensor 46 is configured with a light receiving element such as a charge coupled device (CCD) linear image sensor or a complementary metal oxide semiconductor (CMOS) image sensor, and converts received light into a signal indicating an intensity thereof. The sensor 46 includes a color filter and generates image information representing a color of the original document M. The sensor 46 receives the reflected light and outputs the obtained image information.

As shown in FIG. 3, the platen glass 48 has a function of supporting the original document M that is an image reading target. The platen glass 48 is configured with a transparent and flat glass plate. The platen glass 48 is not limited to a glass plate, and may be, for example, an acrylic plate.

The platen cover 50 has a function of blocking external light. Specifically, as shown in FIG. 1, the platen cover 50 covers the platen glass 48 so as to block external light.

The image reading section 12 includes a light source 30, a light source 32, and a switching mechanism 34 inside the full-rate carriage 40.

As shown in FIG. 3, the light source 30 has a function of irradiating the original document M that is an image reading target with light in the present exemplary embodiment. The light source 30 irradiates the original document M with light at an incidence angle $\theta 1$ from a rear side of the full-rate carriage 40 in a movement direction with respect to the normal direction of the original document M. The light source 30 is fixed to the full-rate carriage 40 such that the original document M is irradiated with light at the incidence angle $\theta 1$ (in other words, the light is incident thereto). The light source 30 is provided at a position at which a main light beam of reflected light of the light applied to the original document M is not blocked. In the present exemplary embodiment, as an example, the incidence angle θ1 of the light from the light source 30 is set to 5°, but the present disclosure is not limited to this. The light source 30 in the present exemplary embodiment is an example of a second light source in the present disclosure. In FIG. 3, an optical path of the light applied from the light source 30 to the original document M is denoted by the reference sign OP1.

As the light source 30, for example, white light such as light from a fluorescent lamp or a rare gas fluorescent lamp (for example, a xenon fluorescent lamp) may be used, or a light source may be used in which plurality of white LEDs are arranged in the main scanning direction and a diffusion plate or the like is used to make a luminance distribution in the main scanning direction uniform.

Figure 4:
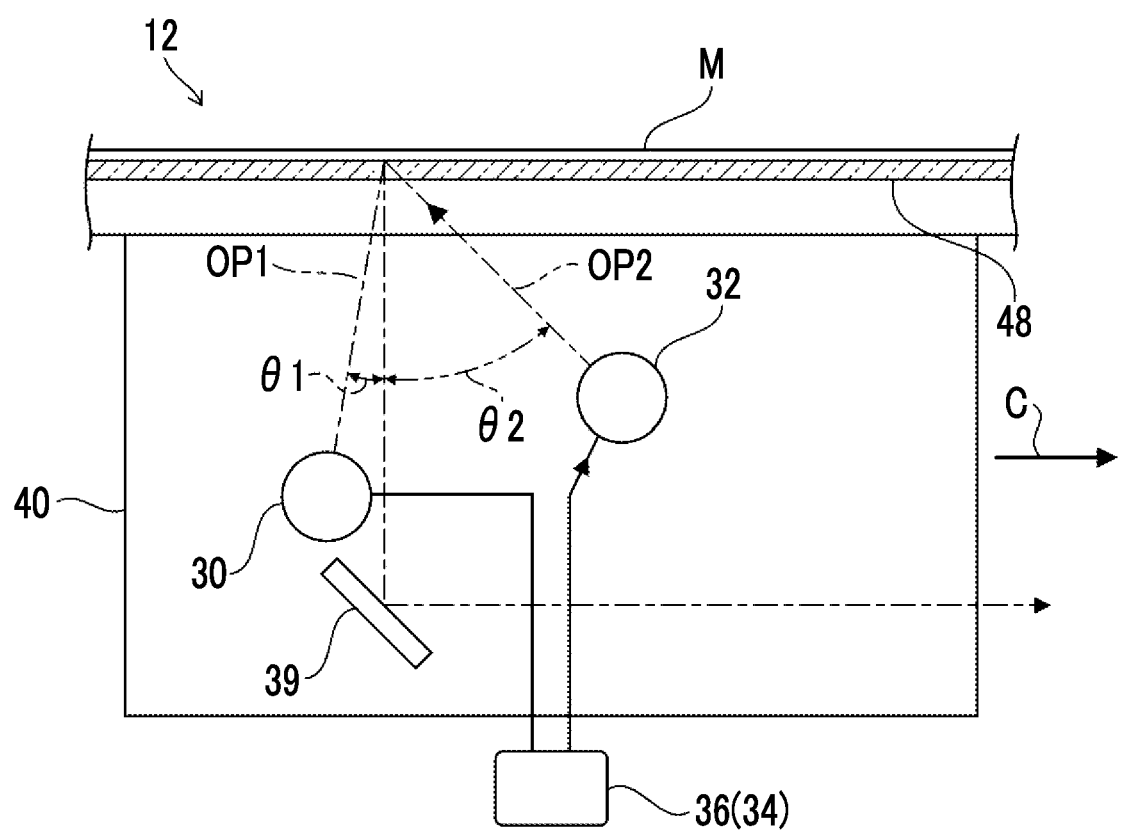
FIG. 4 is a diagram showing a device configuration of the image reading device shown in FIG. 3, and shows a scanning operation in which light from a second light source is incident to the image reading target.

As shown in FIG. 4, the light source 32 has a function of irradiating the original document M with light at an angle different from that of the light source 30. The light source 32 irradiates the original document M with light at an incidence angle θ2 from a front side of the full-rate carriage 40 in the movement direction with respect to the normal direction of the original document M. The light source 32 is fixed to the full-rate carriage 40 such that the original document M is irradiated with light at the incidence angle θ2 (in other words, the light is incident thereto). The light source 32 is provided at a position at which a main light beam of reflected light of the light applied to the original document M is not blocked. The incidence angle θ1 is smaller than the incidence angle θ2. In the present exemplary embodiment, as an example, the incidence angle θ2 of the light from the light source 32 is set to 45°, but the present disclosure is not limited to this. The light source 32 in the present exemplary embodiment is an example of a first light source in the present disclosure. In FIG. 4, an optical path of the light applied from the light source 32 to the original document M is denoted by the reference sign OP2.

As the light source 32, in the same manner as 30, for example, white light such as light from a fluorescent lamp or a rare gas fluorescent lamp (for example, a xenon fluorescent lamp) may be used, or a light source may be used in which plurality of white LEDs are arranged in the main scanning direction and a diffusion plate or the like is used to make a luminance distribution in the main scanning direction uniform.

The switching mechanism 34 has a function of sequentially switching light incident to the original document M from a plurality of light sources during an image reading operation (during a scanning operation) for the original document M. The switching mechanism 34 of the present exemplary embodiment sequentially switches the light incident to the original document M by repeatedly turning on the light source 30 and the light source 32 in order during the scanning operation. In other words, the switching mechanism 34 alternately turns on the light source 30 and the light source 32 during the scanning operation to alternately switch the light incident to the original document M. The switching mechanism 34 includes a switching control section 36. The switching control section 36 of the present exemplary embodiment is an example of a control section in the present disclosure.

The switching control section 36 has a function of controlling turning-on of a plurality of light sources and sequentially turning on the plurality of light sources during the scanning operation. The switching control section 36 of the present exemplary embodiment controls power supplied to the light source 30 and the light source 32, the light sources are turned on by the power supply, and the light sources are turned off by the supply stop. The light source 30 and the light source 32 are alternately turned on by the switching control section 36.

A scanning operation of the image reading section 12 is controlled by the control section 16. That is, in a case where the scanning operation of the image reading section 12 is started by the control section 16, the switching mechanism 34 (switching control section 36) is operated.

Figure 6:
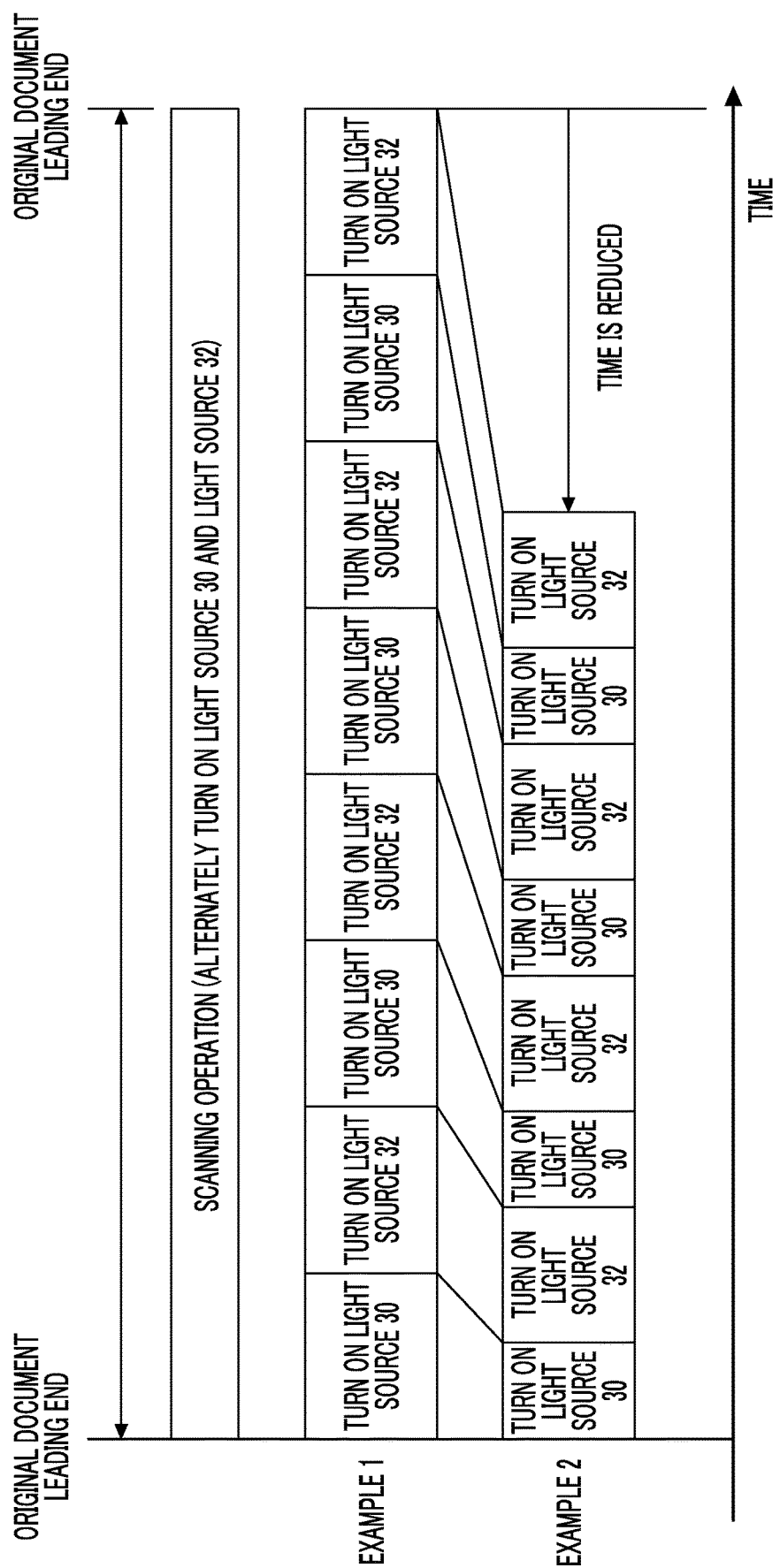

The switching control section 36 may perform control such that turning-on times of the plurality of light sources are different from each other. Specifically, as shown in FIG. 6, the switching control section 36 may set the turning-on time of the light source 30 to be shorter than the turning-on time of the light source 32.

The switching control section 36 may process an image obtained by the light source 30 and an image obtained by the light source 32 differently. Specifically, processing on an image signal obtained when the light source 30 is turned on may be different from processing on an image signal obtained when the light source 32 is turned on. As an example, the processing on the image signal obtained when the light source 30 is turned on may be simplified compared with the processing on the image signal obtained when the light source 32 is turned on.

As shown in FIGS. 3 and 4, a mirror 39 is provided inside the full-rate carriage 40. The mirror 39 reflects reflected light from the original document M to the half-rate carriage 42. This reflected light is guided to the imaging optical system 44 via the mirror 52 and the mirror 54.

The term "mirror" in the present exemplary embodiment refers to a total reflection mirror.

The image reading section 12 of the present exemplary embodiment has a function of reading image information of the original document M in one scanning operation by alternately turning on the light source 30 and the light source 32 with respect to the original document M. Here, a reflection component of reflected light of the light from the light source 30 mainly represents a texture of the original document M. On the other hand, a reflection component of reflected light of the light from the light source 32 mainly represents a color of the original document M. The texture referred to here includes glossiness or roughness of the original document M. According to the image reading section 12, as described above, it is possible to acquire image information expressing both the color and the texture of the original document M in one scanning operation.

Image Forming Section 14

Next, the image forming section 14 will be described. As shown in FIG. 1, the image forming section 14 of the present exemplary embodiment includes image forming units 60A, 60B, 60C, and 60D, an intermediate transfer belt 62, primary transfer rolls 64A, 64B, 64C, and 64D, a secondary transfer roll 66, a backup roll 68, a paper feeding unit 70, and a fixing unit 72.

The intermediate transfer belt 62 is an endless belt member that is circulated in a direction of an arrow B in the drawing.

The primary transfer rolls 64A, 64B, 64C, and 64D are biased toward photoconductor drums of the image forming units 60A, 60B, 60C, and 60D via the intermediate transfer belt 62. Toner images (that is, developer images) are formed on these photoconductor drums, and the toner images are transferred to the intermediate transfer belt 62.

The secondary transfer roll 66 and the backup roll 68 are mutually biased at a position where the intermediate transfer belt 62 faces the recording medium P such as paper, and a toner image is transferred from the intermediate transfer belt 62 to the recording medium P.

The paper feeding unit 70 includes paper trays 70A and 70B accommodating various recording media P, and supplies the recording medium P at the time of image formation.

The fixing unit 72 includes a roll member r heating and pressurizing the recording medium P, and fixes the toner image transferred to the surface of the recording medium P with heat and pressure.

As described above, the image forming section 14 forms an image on the recording medium P by using toner of each color.

Next, an operation of the present exemplary embodiment will be described.

In the image reading section 12 of the present exemplary embodiment, by using the switching mechanism 34, light incident to the original document M from a plurality of light sources is sequentially switched during a scanning operation on the original document M. In other words, the switching mechanism 34 sequentially switches optical paths of light during the scanning operation. Therefore, in the image reading section 12 of the present exemplary embodiment, image information indicating a texture can be obtained by one scanning operation.

Here, a comparative example in which a scanning operation is performed for each of a plurality of light sources that irradiate the original document M with light at different angles and Example 1 in which a scanning operation is performed while sequentially switching light incident to the original document M from the plurality of light sources will be described with reference to FIG. 5.

Figure 5:
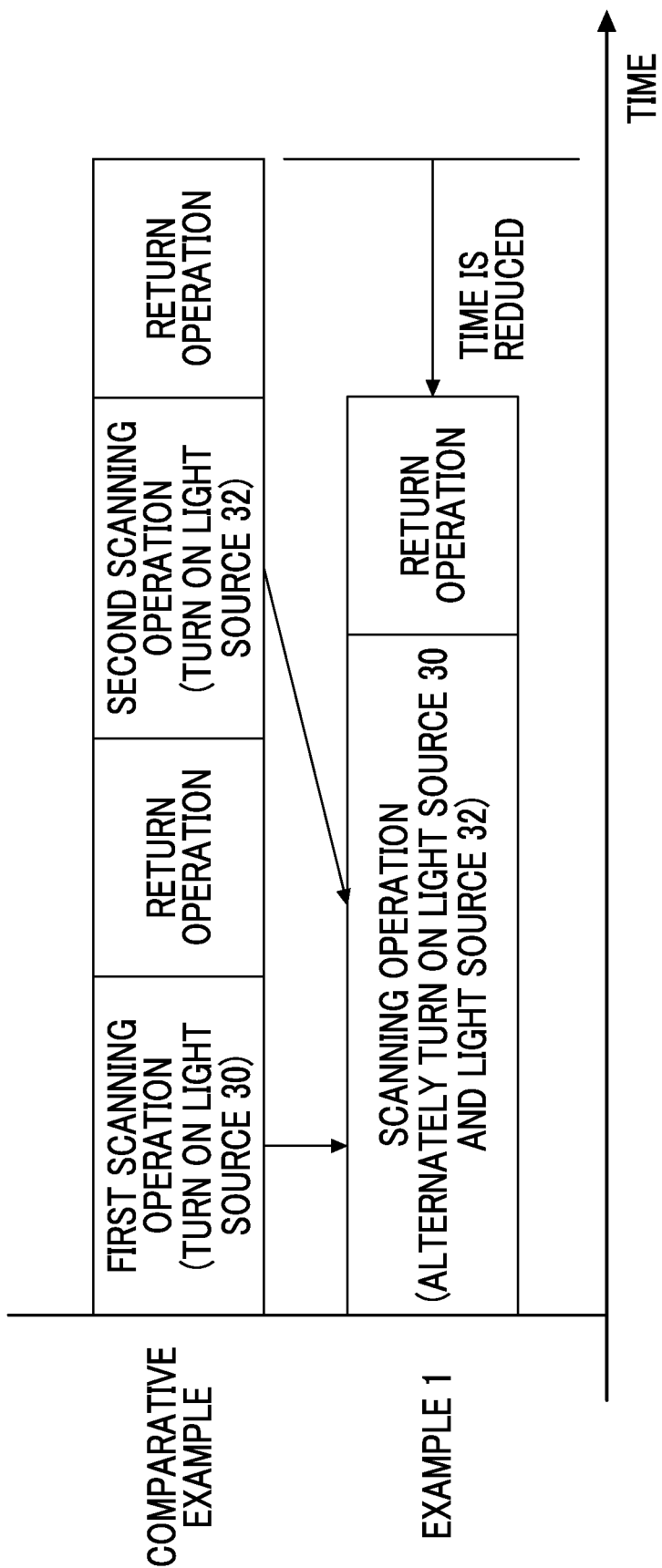

As shown in FIG. 5, in the comparative example, a first scanning operation is performed by moving the full-rate carriage 40 in the sub-scanning direction in a state in which the light source 30 is turned on. After the first scanning operation, the full-rate carriage 40 is returned to the initial position. Next, a second scanning operation is performed by moving the full-rate carriage 40 in the sub-scanning direction in a state in which the light source 32 is turned on. After the second scanning operation, the full-rate carriage 40 is returned to the initial position. Before the scanning operation, calibration is performed based on a white standard.

On the other hand, in Example 1, the light incident to the original document M from the light source 30 and the light source 32 is sequentially and repeatedly switched during the scanning operation. Thus, two types of image signals can be obtained through one scanning operation. That is, image information indicating a texture can be obtained. In Example 1, since the scanning operation is performed once compared with the comparative example, the time for reading the image information indicating a texture from the original document M is reduced. That is, according to the image reading section 12, the reading time (scanning time) of an image from the original document M may be reduced compared with the configuration (comparative example) in which the scanning operation is performed for each of a plurality of light sources that irradiate the original document M with light at different angles.

By reducing the image reading time as described above, productivity is improved. It is possible to prevent an operator from accidentally moving the original document M during scanning.

In the image reading section 12 of the present exemplary embodiment, the switching control section 36 controls turning-on of the plurality of light sources such that the plurality of light sources are sequentially turned on during the scanning operation. Specifically, the switching control section 36 controls turning-on of the light source 30 and the light source 32 such that the light source 30 and the light source 32 are sequentially (alternately) turned on during the scanning operation. Thus, in the image reading section 12, compared with the configuration in which a light source is moved or rotated to switch light incident to the original document M, the positions of the light source 30 and the light source 32 with respect to the full-rate carriage 40 are fixed, and thus it is possible to suppress variations in an incidence angle of light with respect to the original document M.

In the image reading section 12 of the present exemplary embodiment, in a case where the switching control section 36 sets turning-on times of the plurality of light sources to be different, specifically, in a case where the turning-on time of the light source 30 is shorter than the turning-on time of the light source 32, the reading time of an image from the original document M may be reduced compared with the configuration in which turning-on times of the plurality of light sources are identical.

Here, the above Example 1 in which the turning-on time of the light source 30 and the turning-on time of the light source 32 are identical, and Example 2 in which the turning-on time of the light source 30 is shorter than the turning-on time of the light source 32 will be described with reference to FIG. 6. First, light incident to the original document M from the light source 30 has a smaller incidence angle than light incident to the original document M from the light source 32. Specifically, in the present exemplary embodiment, the incidence angle θ1 is 5°. Therefore, reflected light of the light applied from the light source 30 to the original document M has a large amount of specular reflection light components, and sufficient image information (information regarding a texture) can be obtained even in a case where the turning-on time is reduced. Therefore, in Example 2, compared with the configuration (Example 1) in which the turning-on times of the plurality of light sources are identical, the turning-on time of the light source 30 is shorter than the turning-on time of the light source 32 such that the reading time of an image from the original document M may be reduced.

In the image reading section 12 of the present exemplary embodiment, in a case where the switching control section 36 processes an image signal obtained by the light source 30 and an image signal obtained by the light source 32 differently, the reading time of an image from the original document M may be reduced compared with the configuration in which processing on the image signal obtained by the light source 30 and the image signal obtained by the light source 32 is identical.

Figure 7:
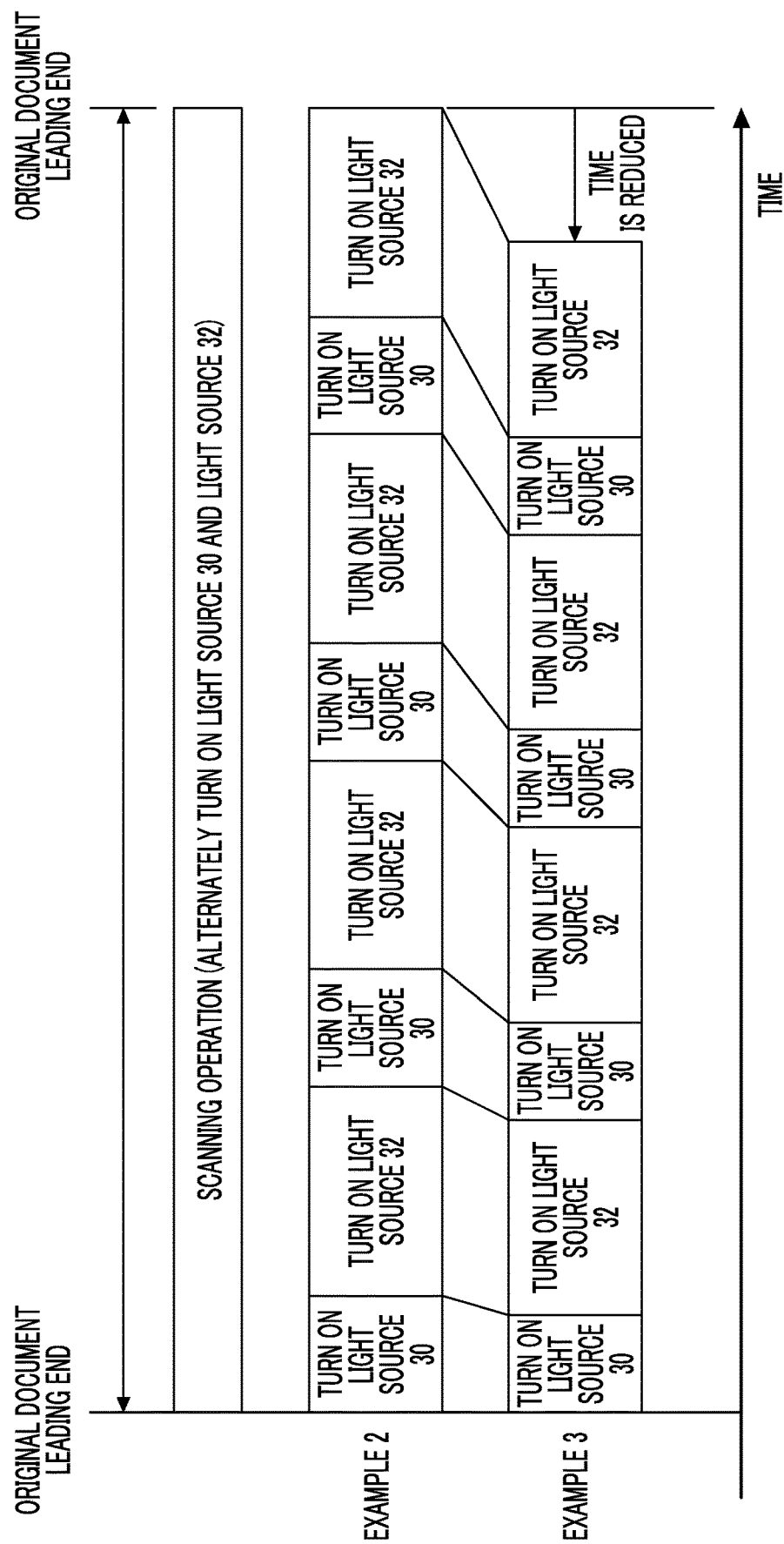

Here, Example 2 in which processing on the image signal obtained by the light source 30 and the image signal obtained by the light source 32 is identical and Example 3 in which processing on the image signal obtained by the light source 30 is more simplified than processing on the image signal obtained by the light source 32 will be described with reference to FIG. 7. First, the image information obtained by the light source 30 is image information regarding a texture. In a case where the image information regarding the texture is determined on the basis of, for example, the presence or absence of glossiness, the irradiation time of the light from the light source 30 can be further reduced. That is, the turning-on time of the light source 30 can be further reduced by performing the processing on the image information obtained by the light source 30 as a simple process for determining the presence or absence of glossiness. Therefore, in Example 3, compared with the configuration (Example 2) in which processing on the image signal obtained by the light source 30 and the image signal obtained by the light source 32 is identical, the reading time of an image from the original document M may be reduced by making the turning-on time of the light source 30 shorter than the turning-on time of the light source 32.

In the image forming apparatus 10 of the present exemplary embodiment, a textured image is read from the original document M by the image reading section 12. The image forming section 14 forms an image on the recording medium on the basis of information regarding the read textured image. As described above, according to the image forming apparatus 10, a textured image is formed on the recording medium P.

Other Exemplary Embodiments

Image Reading Section 82

In the image reading section 12 of the above-described exemplary embodiment, the switching mechanism 34 controls turning-on of the light source 30 and the light source 32 such that the optical path OP1 and the optical path OP2 are switched, but the present disclosure is not limited to this configuration. For example, as in an image reading section 82 shown in FIGS. 8 and 9, the optical path OP1 and the optical path OP2 may be switched by a switching mechanism 84.

Specifically, the image reading section 82 includes a light source 30, a light source 32, a mirror 39, a first light blocking member 86, and a second light blocking member 88 inside the full-rate carriage 40. The first light blocking member 86 and the second light blocking member 88 are an example of a light blocking member in the present disclosure.

The switching mechanism 84 includes the first light blocking member 86 and the second light blocking member 88. The first light blocking member 86 and the second light blocking member 88 block light from a light source.

Figure 8:
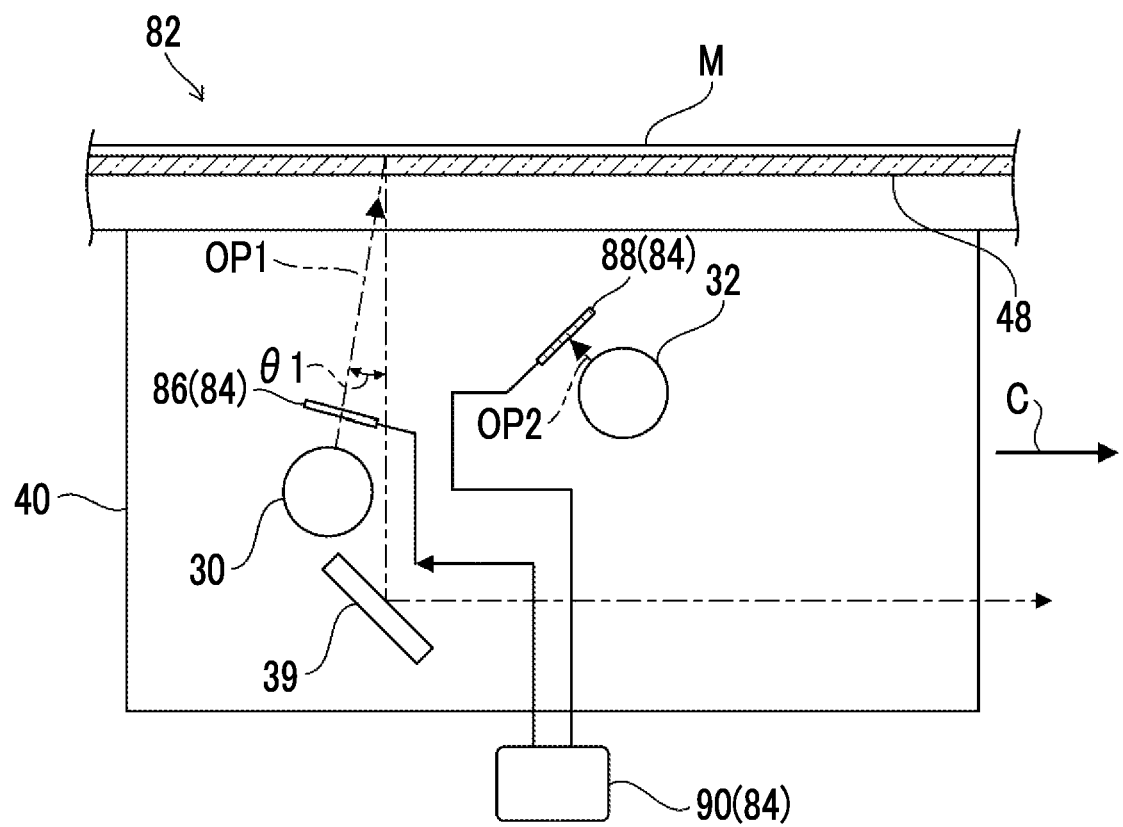
FIG. 8 is a diagram showing a device configuration of an image reading device according to another exemplary embodiment of the present disclosure, and shows a scanning operation in which light from a first light source is incident to an image reading target.

As shown in FIG. 8, the first light blocking member 86 is disposed in the optical path OP1. The first light blocking member 86 is a dimming member having a function of adjusting the light transmittance. The first light blocking member 86 of the present exemplary embodiment can be switched between transparent and opaque with respect to the light from the light source 30 by being electrically turned on and off. ON/OFF control of the first light blocking member 86 is performed by a switching control section 90. A position of the first light blocking member 86 is not particularly limited as long as the first light blocking member 86 is disposed in the optical path OP1. As shown in FIG. 8, the first light blocking member 86 of the present exemplary embodiment is a film-shaped or plate-shaped member, but a shape thereof is not particularly limited as long as the first light blocking member 86 has a function of blocking light from the light source 30.

Figure 9:
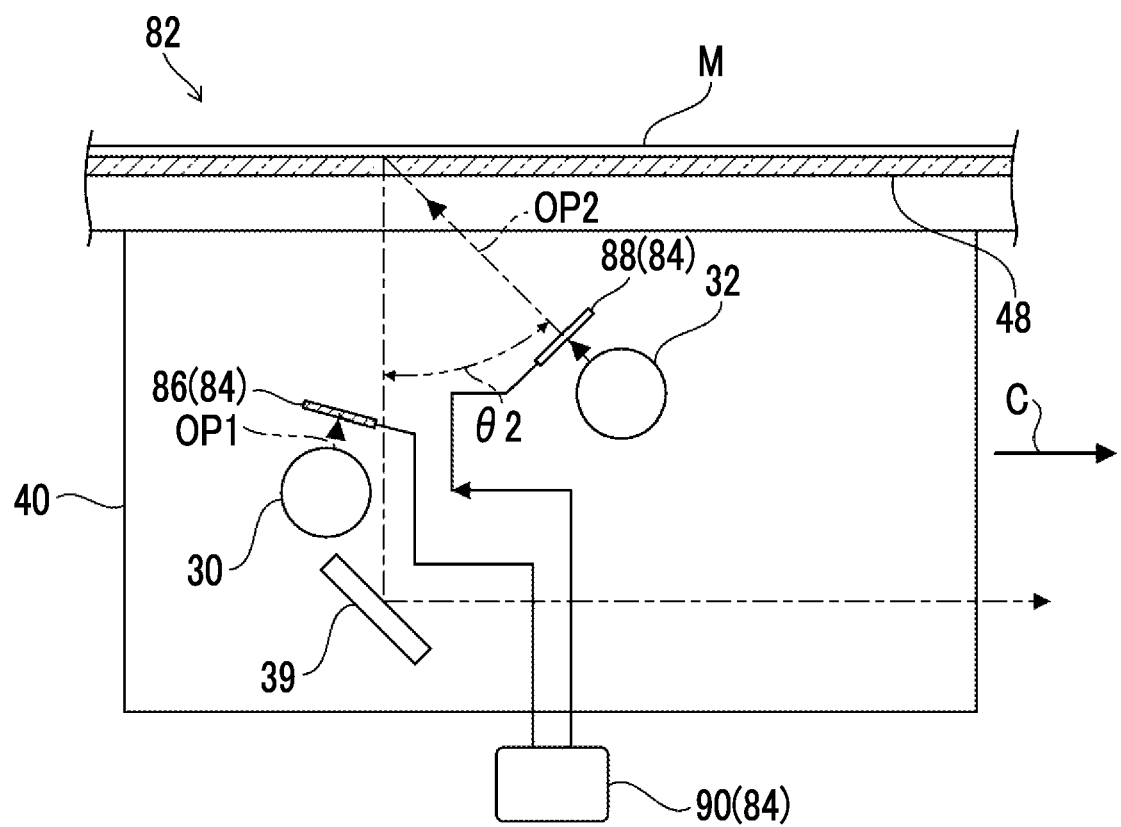
FIG. 9 is a diagram showing a device configuration of the image reading device shown in FIG. 8, and shows a scanning operation in which light from a second light source is incident to an image reading target.

As shown in FIG. 9, the second light blocking member 88 is disposed in the optical path OP2. The second light blocking member 88 is a dimming member having a function of adjusting the light transmittance. The second light blocking member 88 of the present exemplary embodiment can be switched between transparent and opaque with respect to the light from the light source 32 by electrically being turned on and off. ON/OFF control of the second light blocking member 88 is performed by the switching control section 90. A position of the second light blocking member 88 is not particularly limited as long as the second light blocking member 88 is disposed in the optical path OP2. As shown in FIG. 9, the second light blocking member 88 of the present exemplary embodiment is a film-shaped or plate-shaped member, but a shape thereof is not particularly limited as long as the second light blocking member 88 has a function of blocking light from the light source 32.

The switching mechanism 84 includes the switching control section 90. The switching control section 90 electrically controls the first light blocking member 86 and the second light blocking member 88 to switch the light incident to the original document M. Therefore, in the image reading section 82, both the light source 30 and the light source 32 are kept turned on during the scanning operation, and the optical paths are switched by the first light blocking member 86 and the second light blocking member 88. The switching control section 90 may control the power supply time for the first light blocking member 86 and the second light blocking member 88 similarly to the above switching control section 36. With such a configuration, the image reading section 82 can obtain an effect similar to that of the image reading section 12.

The image forming section 14 of the above exemplary embodiment is a tandem system including four image forming units, but the present disclosure is not limited to this. The image forming section 14 may be a rotary type image forming section. A paper transport belt may be provided instead of the intermediate transfer belt, and the transfer may be performed directly from a photoconductor drum to the recording medium P without performing transfer to an intermediate transfer body (intermediate transfer belt).

In the above exemplary embodiment, the image reading section 12 is provided on the upper part of the image forming apparatus 10, but the present disclosure is not limited to this. The image reading section 12, the control section 16, the storage section 18, and the image processing section 20 may form an image reading device.

In the above exemplary embodiment, the full-rate carriage 40 moves in the sub-scanning direction to irradiate the original document M placed on the platen glass 48 with light, but the present disclosure is not limited to this. For example, the original document M may be moved in the sub-scanning direction with respect to the full-rate carriage 40 and be irradiated with light.

In the above exemplary embodiment, the lower surface of the original document M placed on the platen glass 48 is irradiated with light, but the present disclosure is not limited to this configuration. For example, the original document M placed on the platen may be irradiated with light from the full-rate carriage 40 moving above the original document M in the sub-scanning direction toward the upper surface of the original document M.

In the above exemplary embodiment, the light source 30 and the light source 32 are used, but the present disclosure is not limited to this configuration. For example, one or a plurality of light sources different from the light source 30 and the light source 32 may be provided. The light from the light source may be guided to the original document M by a mirror or the like, and the image information may be obtained by using reflected light.

The present disclosure is not limited to the above exemplary embodiment, and various modifications, changes, and improvements can be made without departing from the concept thereof. For example, the above modification examples may be configured by combining a plurality of the modification examples as appropriate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
a plurality of light sources, comprising a first light source and a second light source, that irradiate an image reading target with light at different angles; and
a switching mechanism that sequentially switches the light incident to the image reading target from the plurality of light sources during an image reading operation on the image reading target,
wherein a turning-on time of the second light source is set to be shorter than a turning-on time of the first light source.

2. The image reading device according to claim 1, wherein the switching mechanism includes a control section that controls turning-on of the plurality of light sources and sequentially turns on the plurality of light sources during the image reading operation.

3. The image reading device according to claim 2, wherein the control section sets turning-on times of the plurality of light sources to be different from each other.

4. The image reading device according to claim 3, wherein the second light source has a smaller incidence angle of light with respect to the image reading target than the first light source.

5. The image reading device according to claim 4, wherein the control section sets processing on an image obtained by the first light source to be different from processing on an image obtained by the second light source.

6. An image forming apparatus comprising:
the image reading device according to claim 5 that reads an image from an original document that is the image reading target; and
an image forming section that forms an image on a recording medium on the basis of information regarding the read image.

7. An image forming apparatus comprising:
the image reading device according to claim 4 that reads an image from an original document that is the image reading target; and
an image forming section that forms an image on a recording medium on the basis of information regarding the read image.

8. An image forming apparatus comprising:
the image reading device according to claim 3 that reads an image from an original document that is the image reading target; and
an image forming section that forms an image on a recording medium on the basis of information regarding the read image.

9. An image forming apparatus comprising:
the image reading device according to claim 2 that reads an image from an original document that is the image reading target; and
an image forming section that forms an image on a recording medium on the basis of information regarding the read image.

10. The image reading device according to claim 1, wherein the switching mechanism includes a light blocking member that blocks light applied from the plurality of light sources, and
the light blocking member blocks the light from the light sources such that the light incident to the image reading target from the plurality of light sources is sequentially switched.

11. The image reading device according to claim 10, wherein light blocking times for the plurality of light sources by the light blocking member are different from each other.

12. An image forming apparatus comprising:
the image reading device according to claim 11 that reads an image from an original document that is the image reading target; and
an image forming section that forms an image on a recording medium on the basis of information regarding the read image.

13. An image forming apparatus comprising:
the image reading device according to claim 10 that reads an image from an original document that is the image reading target; and
an image forming section that forms an image on a recording medium on the basis of information regarding the read image.

14. An image forming apparatus comprising:
the image reading device according to claim 1 that reads an image from an original document that is the image reading target; and
an image forming section that forms an image on a recording medium on the basis of information regarding the read image.

15. A non-transitory computer readable medium storing an image reading program causing a computer to execute:
irradiating an image reading target with light at different angles; and
sequentially switching the light incident to the image reading target from a plurality of light sources during an image reading operation on the image reading target,
wherein the plurality of light sources comprise a first light source and a second light source, and
wherein a turning-on time of the second light source is set to be shorter than a turning-on time of the first light source.

16. An image reading method comprising:
irradiating an image reading target with light at different angles; and
sequentially switching the light incident to the image reading target from a plurality of light sources during an image reading operation on the image reading target,
wherein the plurality of light sources comprise a first light source and a second light source, and
wherein a turning-on time of the second light source is set to be shorter than a turning-on time of the first light source.

* * * * *